Sept. 16, 1952         R. C. WILCOCK ET AL         2,611,008
             CIRCUIT TESTER FOR BATTERY-ENERGIZED CIRCUITS
                        Filed March 12, 1951

INVENTORS.
ROBERT C. WILCOCK
PAUL E. HASTINGS
BY THEIR ATTORNEYS.
HARRIS, KIECH, FOSTER & HARRIS
BY

Patented Sept. 16, 1952

2,611,008

UNITED STATES PATENT OFFICE 2,611,008

CIRCUIT TESTER FOR BATTERY-ENERGIZED CIRCUITS

Robert C. Wilcock and Paul E. Hastings, Pomona, Calif.

Application March 12, 1951, Serial No. 215,066

10 Claims. (Cl. 175—183)

1

Our invention relates to a circuit tester for battery-energized circuits to determine the presence of circuit faults before permanently connecting the battery to the circuit.

Circuit faults in the nature of short circuits or leakage paths may have been the cause of a run-down or discharged storage battery, and should be corrected before a new or recharged battery is connected to the circuit. For example, in the electrical system of an automobile it is not uncommon to discover the battery has become discharged by some circuit fault in the electrical system. Before installing a new or recharged battery it is very desirable to test the circuits to be sure that such a fault is not in existence, otherwise the new or recharged battery may follow the fate of its predecessor.

It is an object of the invention to provide a simple, portable and inexpensive device usable by the garage mechanic or service station attendant to test a battery-energized circuit to determine the presence of circuit faults before permanently connecting the battery in the circuit.

A further object of the invention is to provide a circuit tester including spaced terminal members, one connectable to the terminal of the battery and the other contractable by the conventional clamp of a battery cable, there being an electric bulb connected serially between the terminal members.

A further object of the invention is to provide a novel arrangement for insulating such terminal members and for electrically connecting the bulb in series circuit therewith.

A further object of the invention is to provide a socket means in one of the terminal members capable of receiving the base of an electric bulb, the luminous portion of the bulb being viewable from the exterior of the circuit tester.

The usual storage battery has a tapered terminal which fits into a tapered opening of a terminal clamp to connect the battery in the circuit. It is an object of the present invention to provide a circuit tester having a tapered cavity fitting over the battery terminal and having a tapered portion which can be either temporarily contacted by the terminal clamp to give an instantaneous or temporary indication of a circuit fault, or which will receive the terminal clamp during checking for the circuit fault.

Another object is to provide such a socket means selectively receiving such a bulb or a plug of an extension means which receives the bulb.

A further object is to provide a circuit tester attachable to a battery and providing a signal

2 means, such as an electric bulb, which can be positioned at a remote point to indicate the presence or absence of circuit faults.

Further objects and advantages of the invention will be evident to those skilled in the art from the following description of an exemplary embodiment.

Referring to the drawing.

Figure 1:
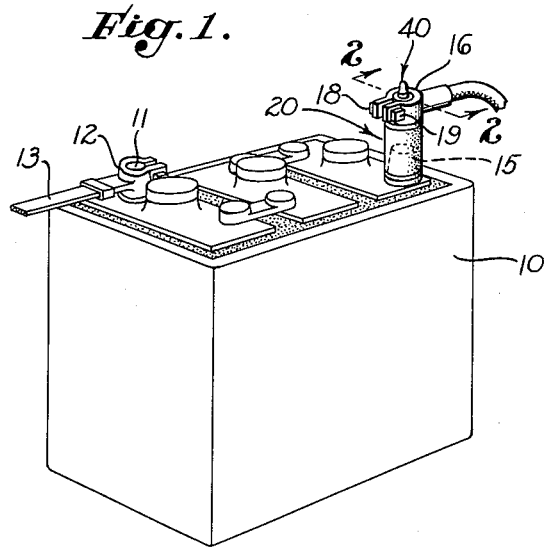
Fig. 1 is a perspective view of a storage battery with the invention in place on one terminal thereof.

Fig. 1 shows the usual three-cell storage battery 10 providing a terminal 11 which in an automobile electrical system is usually connected to ground through a terminal clamp 12 and a conductor 13.

Figure 2:
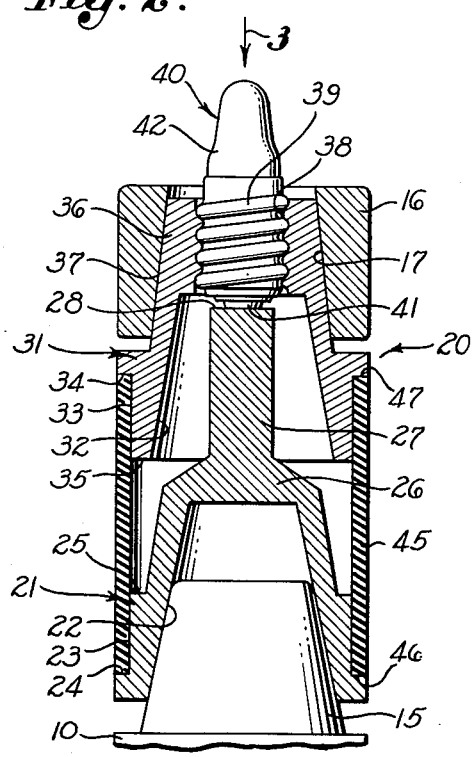
Fig. 2 is a sectional view of the circuit tester of the invention taken along the line 2—2 of Fig. 1 and showing the terminal clamp in place.
Figure 3:
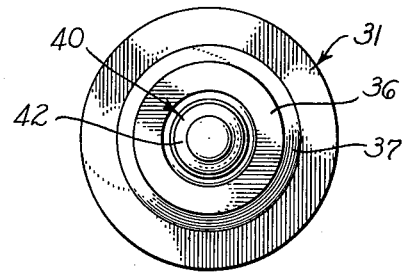
Fig. 3 is a top view of the circuit tester taken in the direction of the arrow 3 of Fig. 2 with the terminal clamp removed.

The battery 10 provides another terminal 15 which is usually tapered as best shown in Figs. 1 and 2. This terminal conventionally receives a terminal clamp 16 providing a correspondingly tapered opening 17 and adapted to surround the terminal 15, being clamped thereto by tightening a nut 18 and a bolt 19.

The invention includes a circuit tester 20 connectible to the tapered terminal 15 of the battery, the preferred form being as shown in Fig. 2. This form includes a lower terminal member 21 having a tapered socket 22 adapted to be fitted frictionally on the tapered terminal 15. This lower terminal member provides a cylindrical portion 23 terminating at a shoulder 24 and at a ledge 25. Above this ledge the lower terminal member 21 tapers to a head 26 from which a conducting portion or post 27 extends upwardly to provide a top face 28.

The circuit tester 20 includes also an upper terminal member 31 having a tapered opening 32 in which the post 27 extends centrally upward. It includes also a cylindrical portion 33 extending between a shoulder 34 and an end face 35. Additionally, the upper terminal member 31 provides a terminal portion 36 which is preferably tapered to provide a tapering external surface 37 of a size and shape to fit into the tapered opening 17 of the terminal clamp 16.

The terminal portion 36 also provides a socket means 38 for receiving the base 39 of an electric bulb 40, this bulb providing an energizing terminal 41 at one end and a luminous portion 42 at the other end. The electric bulb 40 is shown as including a screw-type base which can be screwed into the threaded socket as shown. It should be clear, however, that other types of connections can be employed such as a bayonet-type connection or any other conventional connection for securing a bulb in a socket.

The lower and upper terminal members 21 and 31 are supported in spaced relationship and insulated from each other by a sleeve of insulating material 45 suitably connected to the cylindrical portions 23 and 33. A tight frictional fit will suffice in this connection. The sleeve 45 provides ends 46 and 47 respectively engaging the shoulders 24 and 34 to maintain a fixed spacing between the lower and upper terminal members 21 and 31. This spacing should be such that when the electric bulb 40 is screwed into the socket means 38 its energizing terminal 41 will engage the top face 28 of the post 27 to connect the electric bulb serially between the terminal members 21 and 31.

In using the circuit tester, it is slipped downwardly over the tapered terminal 15 of a newly-installed battery. The terminal clamp 16 is then touched against any portion of the exposed external surface 37 of the terminal portion 36. If the electric bulb 40 becomes illuminated, the operator knows that a circuit fault is present which should be corrected before permanently connecting the terminal clamp 16 to the tapered terminal 15 of the battery.

To facilitate a determination that the circuit fault has been corrected, the terminal clamp 16 can be temporarily slipped over the terminal portion 36, as suggested in Figs. 1 and 2, it being unnecessary to tighten the nut 18 at this time as the engagement between the tapered external surface 37 and the wall of the tapered opening 17 will provide a good electric contact. The operator then checks the circuit for the existing fault. Such correction will be indicated by a deenergization of the electric bulb 40. The circuit tester 20 can then be removed and the terminal clamp 16 safely connected to the tapered terminal 15 of the battery.

In this embodiment of the invention it is preferable that the illumination of the electric bulb 40 be observable from the top of the circuit tester. Maximum visibility is afforded by exposure of the luminous portion 42 above the terminal portion 36. However, it is within the contemplation of the invention that a shorter bulb can be used in which the luminous portion 42 will be disposed at least partially in the socket means 38 to give some degree of protection to the glass of the luminous portion 42. Alternatively, this luminous portion can be caged in any conventional manner as by using a removable wire cage extending upward from the terminal portion 36 and protecting the bulb 40 from breakage should the circuit tester be accidentally dropped in a bulb-down position. It has been found, however, that the bulb 40 is not easily broken even if disposed in an exposed position. This bulb is conventionally a small flashlight bulb and some forms thereof are extremely resistant to breakage.

The electric bulb 40 should preferably have a voltage rating the same as or somewhat lower than that of the battery, in which event it will glow brightly should the circuit fault be a low-resistance short-circuit. Circuit faults of higher resistance will produce a decreased-intensity illumination of the bulb, the intensity giving some indication as to the type of circuit fault present.

Figure 4:
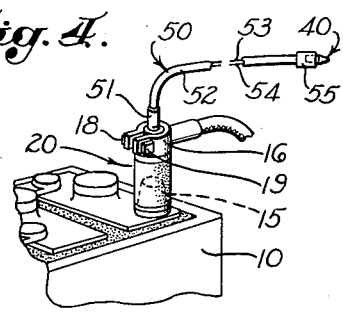
Fig. 4 is a fragmentary perspective view of a modification of the invention in which the electric bulb is positioned at a remote point to facilitate its observation during such time as the circuit fault is being corrected.

To facilitate observation of the electric bulb 40 when correcting a circuit fault, it is often desirable to dispose the bulb at a remote point within the view of the mechanic while in the process of correcting the circuit fault, thus making it unnecessary to return to the battery position to determine if the fault has been corrected. Fig. 4 shows an extension means 50 usable in this connection. While the terminal clamp 16 is connected to the terminal portion 36, as suggested in Fig. 1, the bulb 40 can be removed from its socket means 38 and replaced by a plug 51 of the extension means 50. To this plug is connected a cable 52 providing conductors 53 and 54 connected respectively to the socket means 38 and the top face 28 of the post 27. The cable 52 is preferably several feet in length, a cable of about six feet in length being quite satisfactory. At the far end of this cable 52 is connected a socket 55 shaped to receive the electric bulb 40 previously removed from the socket means 38, the socket 55 connecting the bulb 40 in series with the conductors 53 and 54.

The cable 52 is flexible, and the mechanic can dispose the socket 55 and its bulb 40 at any convenient location where it can be observed during testing of the circuit to remove the existing fault. The bulb 40 can even be used as a light source to illuminate the zone in which the circuit fault is thought to exist. Deenergization of the bulb 40 will indicate correction of the circuit fault, whereupon the plug 51 can be disconnected, the terminal clamp 16 detached, the invention removed from the battery terminal, and the terminal clamp 16 then connected directly to the battery terminal.

Various changes and modifications can be made without departing from the spirit of the invention as defined in the appended claims.

We claim as our invention:

1. A circuit tester for battery-energized circuits to determine the presence of circuit faults before permanently connecting a terminal of the battery to a terminal clamp, said circuit tester including: a lower terminal member detachably connectable to said battery terminal; an upper terminal member providing an exposed surface contactable by said battery clamp, said lower and upper terminal members being formed of conductive material; non-conductive means holding said lower and upper terminal members in spaced non-conductive relationship with respect to each other; and an electric bulb mounted to be viewable for signalling purposes and connected serially between said upper and lower terminal members to be energized by current from said battery flowing in said circuit due to such circuit fault.

2. A circuit tester as defined in claim 1 in which said terminal clamp provides an opening, and in which said upper terminal member provides a terminal portion fitting into said opening.

3. A circuit tester as defined in claim 1 in which said upper terminal member provides a socket means for receiving said electric bulb.

4. A circuit tester as defined in claim 3 in which said socket means faces upwardly at the top of said upper terminal member and in which said bulb provides a base and a luminous portion, said base fitting in said socket means and said luminous portion being visible at the top of said upper terminal member.

5. A circuit tester as defined in claim 4 in which said bulb provides a downwardly facing terminal, and in which said lower terminal member provides a conducting portion contacting said bulb terminal.

6. A circuit tester for battery-energized circuits to determine the presence of circuit faults before permanently connecting a tapered terminal of the battery to a terminal clamp having a correspondingly tapered opening, said circuit tester including: a lower terminal member providing a tapered socket shaped to be slipped over said tapered terminal of said battery; an upper terminal member providing a tapered exposed terminal portion of substantially the same size as said battery terminal whereby said terminal clamp can be selectively touched thereto and positioned therearound in electrical contact therewith, said lower and upper terminal members being formed of conductive material; means for electrically insulating said upper and lower terminal members from each other, said last-named means holding said terminal members in spaced non-conductive relationship with respect to each other; and an electric bulb mounted to be viewable for signalling purposes and connected serially between upper and lower terminal members to be illuminated by current from said battery flowing in said circuit due to such circuit fault.

7. A circuit tester for battery-energized circuits to determine the presence of circuit faults before permanently connecting a terminal of the battery to a terminal clamp, said circuit tester including: a lower terminal member detachably connectable to said battery terminal; an upper terminal member providing an exposed surface contactable by said battery clamp, each of said terminal members being formed of conductive material and each providing a cylindrical portion; a sleeve of insulating material connected to said cylindrical portions to support same in spaced and electrically-insulated relationship; and an electric bulb mounted to be viewable for signalling purposes and connected serially between said upper and lower terminal members to be energized by current from said battery flowing in said circuit due to such circuit fault.

8. A circuit tester as defined in claim 7 in which said upper terminal member provides a socket means receiving said bulb, said bulb providing an energizing terminal, and in which said lower terminal member provides a conducting member extending to engage said terminal of said bulb.

9. A circuit tester as defined in claim 7 in which the upper and lower terminal members provide shoulders respectively at the top and bottom of the respective cylindrical portions, said sleeve of insulating material providing end faces respectively engaging said shoulders.

10. A circuit tester for battery-energized circuits to determine the presence of circuit faults before permanently connecting a terminal of the battery to a terminal clamp, said circuit tester including: a lower conductive terminal member detachably connectable to said battery terminal; an upper conductive terminal member providing a terminal portion fitting said terminal clamp and providing a socket means connected serially between said upper and lower terminal members; non-conductive means for holding said terminal members in spaced non-conductive relationship with respect to each other; a cable providing a plug at one end connectable to said socket means and providing a socket at its other end; and an electric bulb in said socket, said cable connecting said electric bulb serially between said upper and lower terminal members to be energized by current from said battery flowing in said circuit due to such circuit fault, said plug and said socket means forming a detachable connection permitting said terminal clamp to be connected with and disconnected from said terminal portion of said upper terminal member.

ROBERT C. WILCOCK.
PAUL E. HASTINGS.

REFERENCES CITED

The following references are of record in the file of this patent:

UNITED STATES PATENTS

| Number | Name | Date |
| --- | --- | --- |
| 2,286,101 | Norberg et al. | June 9, 1942 |
| 2,354,339 | Sullins | July 25, 1944 |